United States Patent
Sharma (10) Patent No.: US 11,436,131 B2
(45) Date of Patent: Sep. 6, 2022

(54) SYSTEMS AND METHODS FOR SOFTWARE TESTING USING A DISPOSABLE CODE

(71) Applicant: Citrix Systems, Inc., Fort Lauderdale, FL (US)

(72) Inventor: Hardeep Sharma, Cambridge (GB)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 1265 days.

(21) Appl. No.: 15/840,462

(22) Filed: Dec. 13, 2017

(65) Prior Publication Data
US 2019/0179736 A1    Jun. 13, 2019

(51) Int. Cl.
| G06F 11/36 | (2006.01) |
| G06F 11/34 | (2006.01) |
| G06F 8/38 | (2018.01) |
| G06F 11/32 | (2006.01) |

(52) U.S. Cl.
CPC ............ *G06F 11/3688* (2013.01); *G06F 8/38* (2013.01); *G06F 11/321* (2013.01); *G06F 11/3466* (2013.01); *G06F 11/3644* (2013.01); *G06F 11/3664* (2013.01)

(58) Field of Classification Search
CPC .................................................. G06F 11/3688
USPC .......................................................... 717/124
See application file for complete search history.

(56) References Cited

U.S. PATENT DOCUMENTS

| 6,332,168 | B1 * | 12/2001 | House | ................. G06F 9/44521 713/2 |
| 8,296,445 | B1 * | 10/2012 | Hackborn | ........... G06F 11/3664 709/228 |
| 2003/0191869 | A1 * | 10/2003 | Williams | ................ G06F 30/33 719/328 |
| 2007/0168998 | A1 * | 7/2007 | Mehta | ................. G06F 11/3676 717/130 |
| 2012/0167057 | A1 * | 6/2012 | Schmich | ............. G06F 11/3644 717/130 |
| 2016/0077955 | A1 * | 3/2016 | Werghis | ................ G06F 3/0481 715/762 |

OTHER PUBLICATIONS

Kalyan-Ram Chilakamarri and S. Elbaum, "Reducing coverage collection overhead with disposable instrumentation," 15th International Symposium on Software Reliability Engineering, 2004, pp. 233-244, doi: 10.1109/ISSRE.2004.32. (Year: 2004).*

(Continued)

*Primary Examiner* — James D. Rutten
(74) *Attorney, Agent, or Firm* — Fox Rothschild LLP; Robert J. Sacco; Carol E. Thorstad-Forsyth (57) ABSTRACT

A method and system for testing a software application includes receiving and storing a software application for execution in a memory associated with a processor, detecting a first trigger event corresponding to the software application, and attempting to load a disposable code in the memory in response to detecting the trigger event. The method further includes, if the disposable code is successfully loaded in the memory, by the processor: executing the software application to pass a reference to the software application into the disposable code, and executing the disposable code to create an interface between the software application and one or more testing tools. The interface is configured to intercept communications to and from the software application during an execution of the software application.

20 Claims, 3 Drawing Sheets

(56) References Cited

OTHER PUBLICATIONS

A. Skaletsky et al., "Dynamic program analysis of MicrosoftWindows applications," 2010 IEEE International Symposium on Performance Analysis of Systems & Software (ISPASS), 2010, pp. 2-12, doi: 10.1109/ISPASS.2010.5452079. (Year: 2010).*

Y. Ma and E. M. Choi, "Hook-based mobile software testing by using aspect-oriented programming," 2012 International Conference on Systems and Informatics (ICSAI2012), 2012, pp. 2528-2532, doi: 10.1109/ICSAI.2012.6223568. (Year: 2012).*

S. P. Karmore, A. R. Mahajan and G. C. Jarbias, "Development of software interface fortesting of embedded system," 2013 15th International Conference on Advanced Computing Technologies (ICACT), 2013, pp. 1-6, doi: 10.1109/ICACT.2013.6710547. (Year: 2013).*

* cited by examiner

SYSTEMS AND METHODS FOR SOFTWARE TESTING USING A DISPOSABLE CODE

BACKGROUND

Statement of the Technical Field

The present application generally relates to providing software diagnostics and testing services. In particular, the present application relates to systems and methods for software testing using a disposable code.

Description of the Related Art

Programmers write "source code" which may be compiled to create a software (e.g., software programs, applications, etc.—the generic term 'software application' will be used throughout this document) to perform specific tasks. There exists a general need in the development of software/ systems to ensure that the finished product is sufficiently tested prior to its release to the public. Software testing is a process performed to evaluate the quality of the software product or service being tested. Test techniques include, but are not limited to, the process of executing a test case to run a program, project, or application in a controlled environment with a set of test inputs or execution conditions to verify compliance with a specific requirement. A test case is a sequence of steps that are required to perform a certain action within the software. For example, if a software product requires a user to login, a series of test cases could be designed to test whether the login process is functioning properly. A collection of test cases is often referenced as a test suite.

A test case describes a test objective, a test scenario, test steps, an expected test result for the software test, which may be included in a test case file (or script file). The script file may be deployed into the operating system hosting the software, so that the test is performed by execution of the file (manually and/or automatically) to determine if a software application or a feature(s) of the software application is likely to have issues or bugs. Script files may be scripts, application executable files, or data files.

A typical automated testing approach involves the use of a testing tools to generate script files and/or apply stimuli to the software. The software receives the applied stimuli and generates an appropriate response by performing its designated function on that provided input. The testing tool detects the response generated by the software to verify proper operation of the application program in response to the applied stimuli. Testing tools may be external and/or certain testing tools may be embedded as test operation objects within the software itself. Testing tools may employ frameworks that interact with the software being tested programmatically, such as by using an application program interface (API) provided by the software. Such externally accessible APIs that allow the testing tools may directly access the software causing security holes making the software vulnerable to attacks.

Moreover, in conventional testing scenarios, during testing, the testing tools cause the software to make function calls to a programming library (such as a dynamically linked library (DLL) and/or a plug-in class i.e., interaction is always initiated by the software itself through the use of a "call-back". In other words, the testing tools must be loaded by the software, along with any DLLs or plug-ins required for testing. Such "call-backs" must be coded into the software at the time of development that requires additional coding.

To circumvent some of these issues, after programming of the software is completed, a test build of the software may be tested on a computer (physical or virtual machine) with an operating system installed thereon, so as to verify whether there is a defect in the software, before an actual release version is provided to users. Software developers typically remove functionality and APIs built into the test build of the software in the release version. This adds to both complexity and cost of software development, and testing is not possible for the software version released to the users.

SUMMARY

Implementing systems and methods for software application testing using a disposable code. In some scenarios a method for testing a software application may include receiving and storing a software application for execution in a memory associated with a processor, detecting a first trigger event corresponding to the software application, and attempting to load a disposable code in the memory in response to detecting the trigger event. The method may further include, if the disposable code is successfully loaded in the memory, by the processor: executing the software application to pass a reference to the software application into the disposable code, and executing the disposable code to create an interface between the software application and one or more testing tools. The interface may be configured to intercept communications to and from the software application during an execution of the software application. The interface may include at least one API exposed to the one or more software tools.

In one or more scenarios, the application software and the disposable code may be loaded into the same address space of the memory of a computing device.

In some scenarios, the method may also include executing the disposable code to control a test execution of the software application for testing the software application. The system may control the test execution of the software application for testing the software application by receiving information corresponding to one or more external stimuli for the test execution from the one or more testing tools at the interface, and applying the one or more external stimuli to the software application during the test execution. Optionally, the method may also include executing the disposable code to collect data corresponding to the test execution of the software application in response to the application of the one or more external stimuli, and transmit the collected data to the one or more testing tools, via the interface.

In one or more scenarios, the system may terminate a test execution of the software application if the disposable code is not successfully loaded. In such scenarios, the software application may be executed without an interface to interact with the one or more testing tools.

In certain scenarios, the first trigger event may be: an event relating to an execution of the software application, boot up of a computing device that includes the memory, detecting registry and file changes corresponding to the software application, a first execution of the software application, an event relating to testing of the software application, and/or a user command.

In at least one scenario, the method may further include detecting a second trigger event, and in response to detecting the second trigger event, deleting the disposable code from the memory. The second trigger event may be completion of one or more test executions of the software application, deployment of the software application at a customer site, deployment of the software application at a user computing device that does not have permission to perform software testing, detection of a malicious attack at an application program interface (API) exposed by the disposable code, a user command, a failed user authentication, and/or a lapse of a specific time period after loading or activation of the disposable code.

In some scenarios, the software application may not include an interface to interact with the one or more software tools.

BRIEF DESCRIPTION OF THE DRAWINGS

Embodiments will be described with reference to the following drawing figures, in which like numerals represent like items throughout the figures.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The term "software application," as used herein, refers to a program compiled from a source code that includes a set of executable instructions, data (which includes constants, variables, and data structures), or both instructions and data. A software application may be an object, program, application, set of applications, or the like.

The term "disposable code", as used herein, refers to a an executable software application, such as a Java applet, a shim, a programming construct, a small library, a script or a software agent, of limited operability for performing one or more functions. With respect to its limited operability, the disposable code is associated with one or more conditions for its deletion (discussed below). Once loaded, the disposable code may be activated, deactivated and/or deleted based on whether trigger conditions for doing so have been satisfied.

Figure 1:
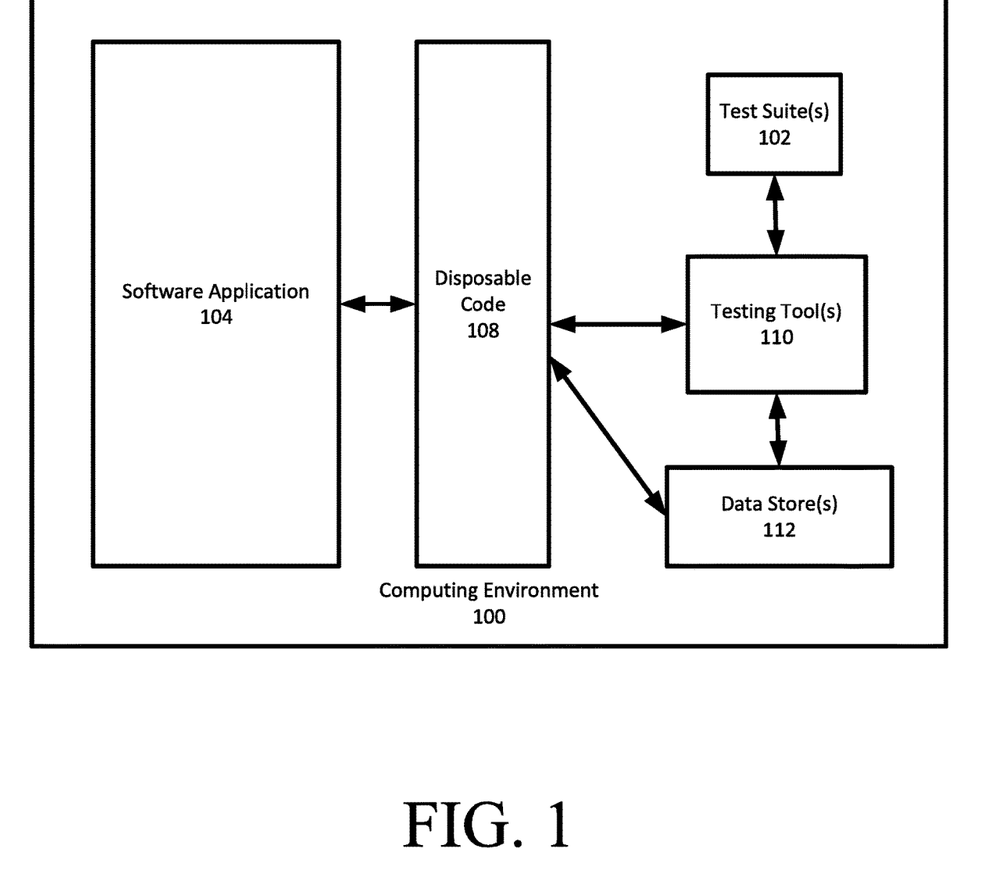
FIG. 1 is an illustration of an exemplary computing environment.

FIG. 1 is a high-level, conceptual illustration of a computing environment 100 for testing software in accordance with an embodiment of the present invention. Computing environment 100 may include more or less components than those shown in FIG. 1. However, the components shown are sufficient to disclose an illustrative embodiment implementing the present solution. Some or all the components of the computing environment 100 can be implemented as hardware, software and/or a combination of hardware and software, arranged to and/or programmed to perform one or more of the methodologies, procedures, or functions described herein.

As shown in FIG. 1, a test suite 102 may be executed to test the performance of a software application 104 using one or more available testing tools 110, and via a disposable code 108. It should be noted that the software application 104 and the disposable code 108 are made of program codes executable in a computing device (real and/or virtual). A computing environment including an underlying operating system (not shown here) may be used to execute the software application 104 and/or the disposable code 108. The operating system may also facilitate testing of the software application 104. In an embodiment, commands for executing objects included in the software application 104 may be generalized into functions and recorded in a function library file (static and/or dynamic).

In an embodiment, the test suite 102 may include one or more test scripts configured to analyze, without limitation, function calls made by the application; the data, objects, and/or resources that are used by and/or provided as inputs to the application; the data, objects, and/or resources that are used by and/or provided as outputs of the application; other interactions that the application may have with other data, objects, and/or resources (which may, e.g., include both local interactions with data, objects, and/or resources on the same device that may execute the application as well as remote interactions with data, objects, and/or resources on other devices that may different from the device executing the application), or the like.

The testing tools 110 may receive inputs from the test suite 102 that describe a sequence of test steps to be executed. The testing tools 110 may then apply external stimuli to software application 104. The software application 104 receives the externally applied stimuli and generates an appropriate response by performing its designated function on that provided input. The testing tools 110 detect the response generated by the software application 104 to verify proper operation of the software application 104 in response to the applied stimuli. Examples of such testing tools may include, without limitation, test management tools, functional testing tools, performance testing tools, security testing tools, or the like.

Conventionally, testing tools 110 may directly interface with the software application 104 via one or more APIs to perform the above functions. However, systems and methods of the current disclosure involve inserting a disposable code 108 (a disposable code) between the testing tools 110 and the software application 104. In an embodiment, disposable code 108 may act as an interface to the software application 104 and may intercept communications between the testing tools 110 and the software application 104. In other words, calls from and to the software application 104 are intercepted by the disposable code 108. The disposable code 108 may in turn control and manipulate the execution of the software application 104 by, without limitation, directly accessing functions, variables, etc. within the software application 104, fetching various data for application of the external stimuli, collecting outputs, returning outputs to the testing tools 110, or the like. To allow the disposable code 108 to control the execution of the software application 104, the disposable code 108 may be loaded into the same process space or address space of the memory of a computing device as the software application 104. Thus, the disposable code 108 is privileged to access all the information about the software application 104, such as, without limitation, global variables, libraries, function calls, or the like. In an embodiment, the disposable code 108 may also include or have access to one or more data stores 112 of configuration data related to the testing tools 110. As such, the software application 104 does not directly interact with the testing tools 110 and may not include any vulnerably exposed APIs. The disposable code 108 and the testing tools 110 may communicate with each other using any suitable commination protocol. Alternatively and/or additionally, in an embodiment, the disposable code 108 may include one or more public APIs for exposing one or more functions to the testing tools 110. The APIs may use authentication techniques such as SSL, network, encryption keys, SSL certificate, or OAuth token, or the like, for enabling secure communication. By using the disposable code, additional functionality may also be added without changing the code of the software application.

In an embodiment, disposable code 108 may be created for one or more software applications, and may include a library containing functions required to control the execution of the software applications during testing. The disposable code 108 may also include pointers (address or identifier) corresponding to the software applications. In an embodiment, the disposable code 108 may be developed or created at the same time as the software application 104, but may be output to a separate file from the software application 104 for storage. Alternatively, the disposable code 108 may be created at a time after the creation of the software application 104 and may be may be output to a separate file from the software application 104 for storage. The disposable code 108 may then be fetched (e.g., from a database or repository) and loaded into the computing environment 100 (e.g., into the same address space of a memory as the software application) by the software application 104 at boot up time and/or at initiation of testing of the software application 104. The software application 104 may load the disposable code 108 using commands similar to those used for loading a library, and may pass an identifier or pointer into the disposable code 108 as a reference to itself. Thereafter, the disposable code 108 may configure, register, execute, and control the operation of the software application 104 (for example, by issuing function calls into the software application based on the communications received from the testing tools 110). It should be noted that the disposable code 108 of the current disclosure has complete knowledge about the software application 104, but the software application 104 itself is unaware of the existence of the disposable code 108 (i.e., the software application 104 does not need to initiate any callbacks and/or expose public APIs during testing). This also allows for testing of release versions of the software application at any time before or after release.

In various embodiments of the current disclosure, the only modification made to the software application 104 being tested is inclusion of a command (if not already present) that initiates and causes the loading of the disposable code in the computing environment upon occurrence of certain trigger events (discussed below).

It should be noted that while the current disclosure describes the disposable code in automatic testing environments, it can similarly be used during manual testing without deviating from the principles of this disclosure. It will also be understood to those skilled in the art, that the principles described in this disclosure may be used for monitoring the execution of a software application, remote control of a software application, live testing of software applications that do not have a user interface, etc. using a disposable code without rewriting the software application itself.

Figure 2:
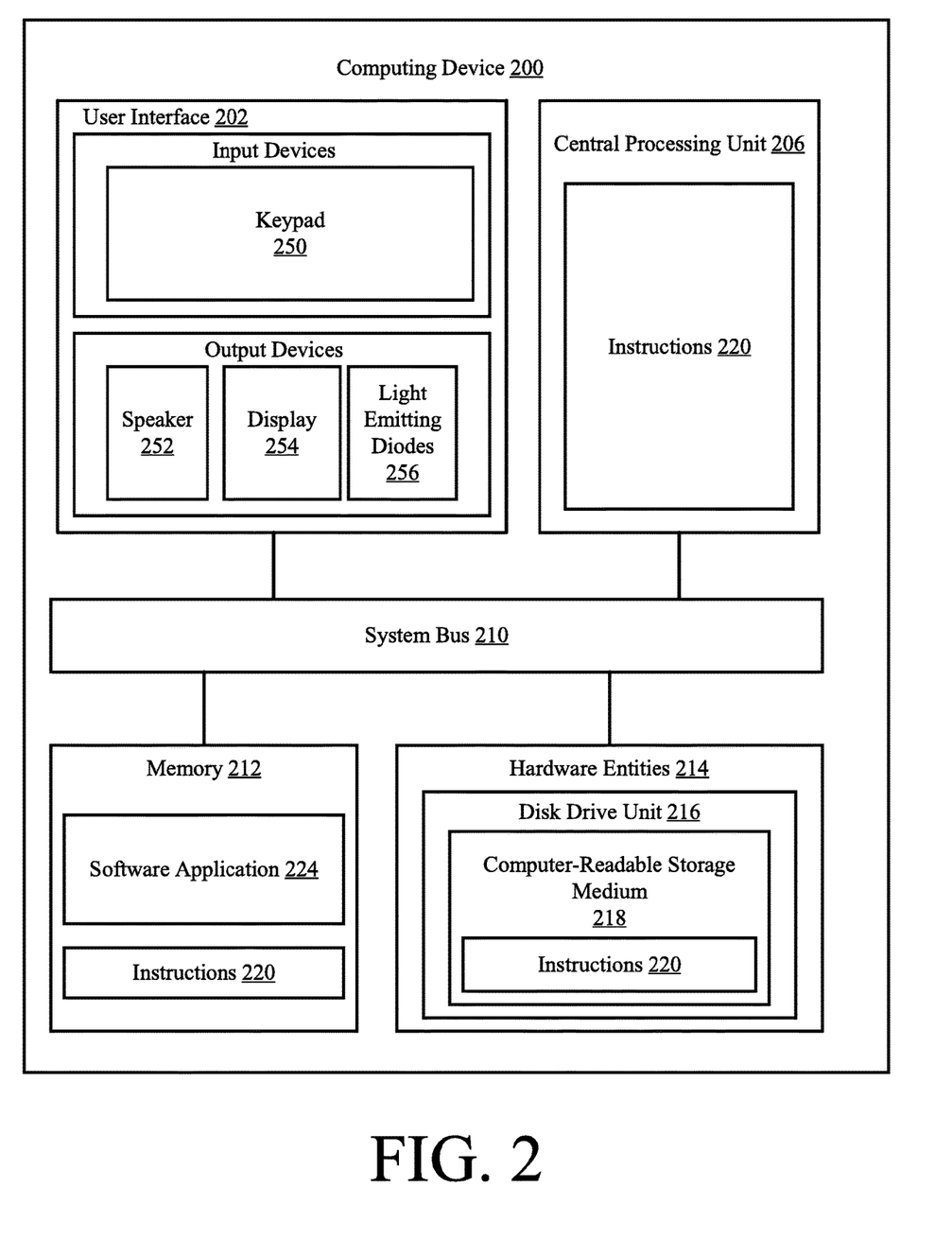
FIG. 2 is an illustration of an exemplary computing device.

Referring now to FIG. 2, there is provided a detailed block diagram of an exemplary architecture for a computing device 200, in which the present invention may be implemented, deployed as and/or executed on any embodiment of the computing device 200. As such, the following discussion of computing device 200 is sufficient for understanding for the implementation of the architecture 100 of FIG. 1. The computing device 200 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, virtual machines, distributed computing environments that include any of the above systems or devices, and the like.

Computing device 200 may include more or less components than those shown in FIG. 2. However, the components shown are sufficient to disclose an illustrative embodiment implementing the present solution. The hardware architecture of FIG. 2 represents one embodiment of a representative computing device configured to facilitate testing, support, and remote execution of software applications. As such, the computing device 200 of FIG. 2 implements at least a portion of a method for (a) loading of a disposable code, and/or (b) testing of a software application, as discussed below.

Some or all the components of the computing device 200 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 2, the computing device 200 comprises a user interface 202, a Central Processing Unit ("CPU") 206, a system bus 210, a memory 212 connected to and accessible by other portions of computing device 200 through system bus 210, and hardware entities 214 connected to system bus 210. The user interface can include input devices (e.g., a keypad 250) and output devices (e.g., speaker 252, a display 254, and/or light emitting diodes 256), which facilitate user-software interactions for controlling operations of the computing device 200.

At least some of the hardware entities 214 perform actions involving access to and use of memory 212, which can be a RAM, a disk driver and/or a Compact Disc Read Only Memory ("CD-ROM"). Hardware entities 214 can include a disk drive unit 216 comprising a computer-readable storage medium 218 on which is stored one or more sets of instructions 220 (e.g., software code) configured to implement one or more of the methodologies, procedures, or functions described herein. The instructions 220 can also reside, completely or at least partially, within the memory 212 and/or within the CPU 206 during execution thereof by the computing device 200. The memory 212 and the CPU 206 also can constitute machine-readable media. The term "machine-readable media", as used here, refers to a single medium or multiple media (e.g., a centralized or distributed database, and/or associated caches and servers) that store the one or more sets of instructions 220. The term "machine-readable media", as used here, also refers to any medium that is capable of storing, encoding or carrying a set of instructions 222 for execution by the computing device 200 and that cause the computing device 200 to perform any one or more of the methodologies, as described herein.

In some scenarios, the hardware entities 214 include an electronic circuit (e.g., a processor) programmed for facilitating (a) loading of a disposable code, and (b) testing of a software application, as discussed below. In this regard, it should be understood that the electronic circuit can access and run a software application 224 installed on the computing device 200. The functions of the software application 224 will become apparent as the discussion progresses.

In one embodiment, a computing device 200 can be a virtual machine. The virtual machine can be any virtual machine, while in some embodiments the virtual machine can be any virtual machine managed by a hypervisor developed by Citrix Systems, IBM, VMware, or any other hypervisor. In other embodiments, the virtual machine can be managed by any hypervisor, while in still other embodiments, the virtual machine can be managed by a hypervisor executing on a server or a hypervisor executing on a client machine.

Figure 3:
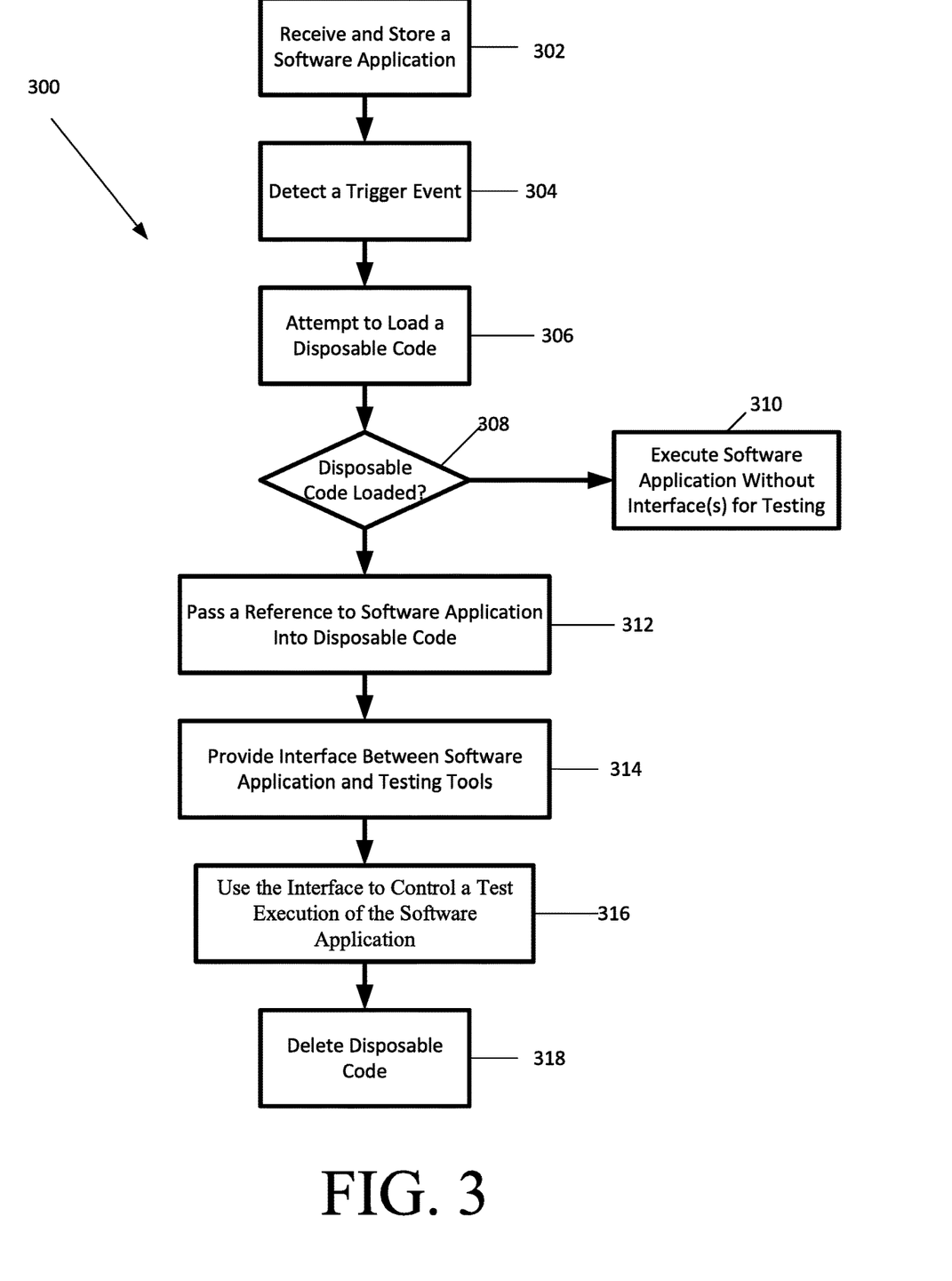
FIG. 3 is a flowchart illustrating an example method for the testing of a software application using a disposable code.

Referring now to FIG. 3, an example method 300 for the testing of a software application, via a disposable code, in a computing environment is illustrated. An example computing environment 100 is illustrated in FIG. 1. In one or more embodiments, the process 300 illustrated in FIG. 3 and/or one or more steps thereof may be performed by a computing device (e.g., any device of FIGS. 1-2). In other embodiments, the process illustrated in FIG. 3 and/or one or more steps thereof may be embodied in computer-executable instructions that are stored in a computer-readable medium, such as a non-transitory computer-readable memory. While the method 300 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 3, but the process may be integrated and/or one or more steps may be performed together, or the steps may be performed in the order disclosed or in an alternate order.

The method 300 may begin at 302, when the system may receive and a store a software application for testing and/or execution. In an embodiment, the software application received may be a test build and/or a release build of the software application.

At 304, the system may detect a first trigger event corresponding the software application. Examples of the trigger event may include, without limitation, an event relating to an execution of the software application, boot up of the system on which the software application is stored, registry and file changes corresponding to the software application, first execution of the software application, an event relating to testing of the software application (e.g., a testing tool attempting to execute a function of the software application, a user command to initiate testing, etc.), a user command, or the like. The system may use any now or hereafter known existing methods for detecting the trigger event, such as, without limitation, log files of the software application.

At 306, in response to detecting the trigger event, the system may attempt (308) to retrieve and load the disposable code into a memory associated with the system. As discussed above, the disposable code is loaded into the same process space or address space of the memory that has the software application. In an embodiment, the system may retrieve the disposable code from a database in communication with the system. Optionally, the disposable code may already be loaded into the system memory. The system may then determine whether or not the attempt was successful at 308. It should be noted that the software application may attempt to load the disposable code only once.

If the attempt to load the disposable code is determined to be unsuccessful (308: NO), the system may execute (310) the software application without any interfaces (such as, external APIs) exposed for testing the software application. In other words, the software application may not be accessible for testing by one or more testing tools. In certain embodiments, the system may also terminate any test execution of the software application in response to determining that the attempt to load the disposable code was unsuccessful.

Alternatively, the software application may directly expose APIs or other types of interfaces for certain types of testing that do not pose a security risk and/or may use a disposable code for other types of testing that pose a security risk.

However, if the attempt to load the disposable code is determined to be successful (306: YES), the system may execute the software application to pass (312) a reference or a pointer to the software application into the loaded disposable code. The following is a simple example of loading a software application and a disposable code in the same memory process space, and passing a reference to the software application into the disposable code:

```
using System.Threading;
using System.Reflection;
namespace ChatApp
{
  static class Program
  {
    /// <summary>
    /// The main entry point for the software application 104
    /// </summary>
    [STAThread]
    public static void Main( )
    {
      Application.EnableVisualStyles( );
      Application.SetCompatibleTextRenderingDefault(false);
              // The software application 104 is created
      ChatServer myChatServer = new ChatServer( );
      dynamic apiServer = null;
      Thread worker = null;
              // locate and start the disposable code 108 passing a reference to software application 104 into it
      try
      {
        string dllPath =
System.IO.Path.GetDirectoryName(System.Reflection.Assembly.GetExecutingAssembly( ).Location) + "\\tAPIServer.dll";
        var DLL = Assembly.LoadFile(dllPath);
        Type APIServerType = DLL.GetExportedTypes( )[0];
        Object[ ] param = { myChatServer };
        apiServer = Activator.CreateInstance(APIServerType, param);
        worker = apiServer.requestStart( );
      }
      catch (Exception e)
      {
        // if there are any issues, don't do anything special, just let it fail silently
        Console.WriteLine("Exception: {0}", e);
      }
      // Start the software application 104
      Application.Run(myChatServer);
              // stop the disposable code 108 when the software application 104 ends
      if (apiServer != null)
      {
        apiServer.requestStop(worker);
      }
    }
  }
}
```

The system may then execute the disposable code to provide an interface (314) between various testing tools and the software application, as discussed above with respect to FIG. 1. The disposable code may, at the interface, intercept all communication to and from the software application. In certain embodiments, the disposable code may also provide an external API to the testing tools.

The disposable code may use the interface to control execution of test runs of the software application (316) based on information received from the testing tools. In an embodiment, controlling the test execution of the software application for testing the software application may include receiving information corresponding to one or more external stimuli for the test execution from the one or more testing tools, at the interface, applying the external stimuli to the software application during the test execution, or the like (discussed above in detail). The disposable code may also be configured to collect data corresponding to the test execution of the software application and transmit it to the testing tools, via the interface.

At 318, the processor may delete and/or terminate the disposable code upon detection of a second trigger event. Examples of such trigger events may include, without limitation, completion of one or more software tests, deployment of the software application at a customer site or at a user computing device that does not have permission to perform software testing, detection of a malicious attack at an API exposed by the disposable code, a user command, failed authentication, lapse of a specific time period after loading or activation, or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either software application or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A method for testing a software application, comprising:
   receiving and storing a software application in a memory associated with a processor;
   detecting, by the processor, a first trigger event corresponding to the software application;
   in response to a detection of the trigger event, performing operations by the software application to load a disposable code into the memory;

determining, by the processor, whether the disposable code was successfully loaded in the memory;
responsive to the disposable code being successfully loaded into the memory, by the processor:
  executing the software application to pass a reference to the software application into the disposable code, and
  executing the disposable code to create a first interface to the software application, wherein the first interface is configured to facilitate indirect interactions between the software application and one or more testing tools via the disposable code by intercepting communications to and from the software application during an execution of the software application; and
responsive to the disposable code being unsuccessfully loaded into the memory, performing operations by the processor to execute the software application in a manner which prevents at least one second interface from being exposed by the software application to the one or more testing tools, wherein the at least one second interface is configured to facilitate direct interactions between the software application and the one or more testing tools for testing at least one first function of the software application.

2. The method of claim 1, further comprising, by the processor, executing the disposable code to control a test execution of the software application for testing the software application.

3. The method of claim 2, wherein controlling the test execution of the software application for testing the software application comprises:
  receiving, at the first interface, information corresponding to one or more external stimuli for the test execution from the one or more testing tools; and
  applying the one or more external stimuli to the software application during the test execution.

4. The method of claim 3, further comprising, by the processor, executing the disposable code to:
  collect data corresponding to the test execution of the software application in response to the application of the one or more external stimuli; and
  communicate the collected data to the one or more testing tools.

5. The method of claim 1, further comprising, in response to the disposable code being unsuccessfully loaded, terminating, by the processor, a test execution of the software application.

6. The method of claim 1, further comprising, in response to the disposable code being successfully loaded, executing, by the processor, the disposable code to create a third interface to the one or more testing tools, the third interface being configured to facilitate the indirect interactions between the one or more testing tools and the software application.

7. The method of claim 1, wherein the first trigger event is selected from one or more of the following:
  an event relating to an execution of the software application;
  boot up of a computing device that includes the memory;
  detecting registry and file changes corresponding to the software application;
  a first execution of the software application;
  an event relating to testing of the software application; or
  a user command.

8. The method of claim 1, further comprising, by the processor:
  detecting a second trigger event; and
  in response to detecting the second trigger event deleting the disposable code from the memory.

9. The method of claim 8, wherein the second trigger event is selected from one or more of the following:
  completion of one or more test executions of the software application,
  deployment of the software application at a customer site,
  deployment of the software application at a user computing device that does not have permission to perform software testing,
  detection of a malicious attack at an application program interface (API) exposed by the disposable code,
  a user command,
  a failed user authentication, or
  a lapse of a specific time period after loading or activation of the disposable code.

10. The method of claim 1, wherein the processor further executes the software application in a manner that allows at least one other interface to be exposed by the software application to interact with the one or more software tools, wherein the at least one other interface is configured to facilitate direct interactions between the software application and the one or more testing tools for testing at least one second function of the software application, testing of the at least one first function of the software application poses a security risk and testing of the at least one second function does not pose a security risk.

11. The method according to claim 1, wherein the first interface or the at least one second interface comprises an application programming interface.

12. A system for testing a software application, the system comprising:
  a memory;
  a processor; and
  a computer-readable storage medium comprising one or more programming instructions that, when executed, will cause the processor to:
    receive and store a software application in an address space of the memory;
    detect a first trigger event corresponding to the software application;
    in response to a detection of the trigger event, cause the software application to attempt to load a disposable code into the address space of the memory;
    determine whether the disposable code was successfully loaded in the memory;
    in response to the disposable code being successfully loaded:
    execute the software application to pass a reference to the software application into the disposable code, and
    execute the disposable code to create a first interface to the software application, wherein the first interface is configured to facilitate indirect interactions between the software application and one or more testing tools via the disposable code by intercepting communications to and from the software application during an execution of the software application; and
    in response to the disposable code being unsuccessfully loaded into the memory, execute the software application in a manner which prevents at least one second interface from being exposed by the software application to the one or more testing tools, wherein the at least one second interface is configured to facilitate direct interactions between the software application and the one or more testing tools for testing at least one first function of the software application.

13. The system of claim 12, further comprising additional programming instructions that are that, when executed, will cause the processor to execute the disposable code to control a test execution of the software application for testing the software application.

14. The system of claim 13, wherein the one or more programming instructions that, when executed, will cause the processor to execute the disposable code to control the test execution of the software application for testing the software application comprise one or more programming instructions that, when executed, will cause the processor to:
   receive, at the first interface, information corresponding to one or more external stimuli for the test execution from the one or more testing tools; and
   apply the one or more external stimuli to the software application during the test execution.

15. The system of claim 14, further comprising additional programming instructions that are that, when executed, will cause the processor to execute the disposable code to:
   collect data corresponding to the test execution of the software application in response to the application of the one or more external stimuli; and
   communicate the collected data to the one or more testing tools.

16. The system of claim 12, further comprising additional programming instructions that are that, when executed, will cause the processor to, in response to the disposable code being unsuccessfully loaded, terminate a test execution of the software application.

17. The system of claim 12, further comprising additional programming instructions that are that, when executed, will cause the processor to, in response to the disposable code being successfully loaded, execute the disposable code to create a third interface to the one or more testing tools, the third interface being configured to facilitate the indirect interactions between the one or more testing tools and the software application.

18. The system of claim 12, wherein the first trigger event is selected from one or more of the following:
   an event relating to an execution of the software application;
   boot up of a computing device that includes the memory;
   detecting registry and file changes corresponding to the software application;
   a first execution of the software application;
   an event relating to testing of the software application; or
   a user command.

19. The system of claim 12, further comprising additional programming instructions that are that, when executed, will cause the processor to:
   detect a second trigger event; and
   in response to detecting the second trigger event, delete the disposable code from the memory.

20. The system of claim 19, wherein the second trigger event is selected from one or more of the following:
   completion of one or more test executions of the software application,
   deployment of the software application at a customer site,
   deployment of the software application at a user computing device that does not have permission to perform software testing,
   detection of a malicious attack at an application program interface (API) exposed by the disposable code,
   a user command,
   a failed user authentication, or
   a lapse of a specific time period after loading or activation of the disposable code.

* * * * *